US010169979B2

(12) United States Patent
Tappan

(10) Patent No.: US 10,169,979 B2
(45) Date of Patent: Jan. 1, 2019

(54) COMMUNICATING ALARM TRIGGER STATUS

(71) Applicant: General Electric Company, Schenectady, NY (US)

(72) Inventor: Jacqueline Marie Tappan, Minden, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/586,785

(22) Filed: May 4, 2017

(65) Prior Publication Data
US 2018/0322765 A1 Nov. 8, 2018

(51) Int. Cl.
*G08B 21/00* (2006.01)
*G08B 21/18* (2006.01)
*G06F 3/0484* (2013.01)

(52) U.S. Cl.
CPC ....... *G08B 21/187* (2013.01); *G06F 3/04845* (2013.01); *G06F 3/04847* (2013.01); *G08B 21/182* (2013.01)

(58) Field of Classification Search
CPC ............ G05B 19/4062; G05B 19/4184; G05B 19/4065; G08B 23/00; G01M 13/045; G06F 11/3058; G01H 1/00
USPC ........... 340/870.16, 679, 506, 680, 682, 683
See application file for complete search history.

(56) References Cited

U.S. PATENT DOCUMENTS

| 5,611,034 | A |   | 3/1997  | Makita  |             |
|-----------|---|---|---------|---------|-------------|
| 5,631,851 | A | * | 5/1997  | Tanaka  | G05B 19/4062 |
|           |   |   |         |         | 700/174     |
| 8,886,392 | B1|   | 11/2014 | Maeng   |             |
| 9,019,124 | B2| * | 4/2015  | Schiff  | G07C 3/14   |
|           |   |   |         |         | 340/3.43    |
| 2003/0110007 | A1 |   | 6/2003 | McGee et al. |      |
| 2010/0100037 | A1 | * | 4/2010 | Cozmi | A61M 5/142 |
|           |   |   |         |         | 604/67      |
| 2012/0084031 | A1 | * | 4/2012 | Saito | G05B 19/4184 |
|           |   |   |         |         | 702/62      |
| 2012/0262472 | A1 |   | 10/2012| Garr et al. |       |

(Continued)

OTHER PUBLICATIONS

PCT Search Report and Written Opinion issued in connection with corresponding PCT Application No. PCT/US2018/029026 dated Aug. 10, 2018.

*Primary Examiner* — John A Tweel, Jr.
*Assistant Examiner* — Munear Akki
(74) *Attorney, Agent, or Firm* — Mintz Levin Cohn Ferris Glovsky and Popeo, P.C.

(57) ABSTRACT

An alarm trigger communicating system and methods of using the same are provided. The alarm trigger communicating system can receive data characterizing an operational state of a machine and a timing information associated with the operational state. The system can access, based on the operational state, an alarm trigger of a plurality of alarm triggers, the alarm trigger can include predefined properties including an alarm threshold. The system can also display a graphical object representing the alarm trigger, the graphical object displayed in a graphical display space can have a first axis and a second axis for displaying a plot over time of operational parameter associated with the machine. The graphical object having a first visual characteristic can indicate the alarm threshold.

24 Claims, 12 Drawing Sheets

(56) References Cited

U.S. PATENT DOCUMENTS

| | | | |
|---|---|---|---|
| 2012/0330577 A1* | 12/2012 | Kar | G01M 13/045 |
| | | | 702/56 |
| 2013/0103353 A1* | 4/2013 | Kloppner | G05B 23/0235 |
| | | | 702/182 |
| 2013/0173042 A1 | 7/2013 | Morisawa et al. | |
| 2014/0055274 A1* | 2/2014 | Hatch | G01H 1/00 |
| | | | 340/679 |
| 2014/0244006 A1* | 8/2014 | Lee | G05B 23/0272 |
| | | | 700/83 |

* cited by examiner

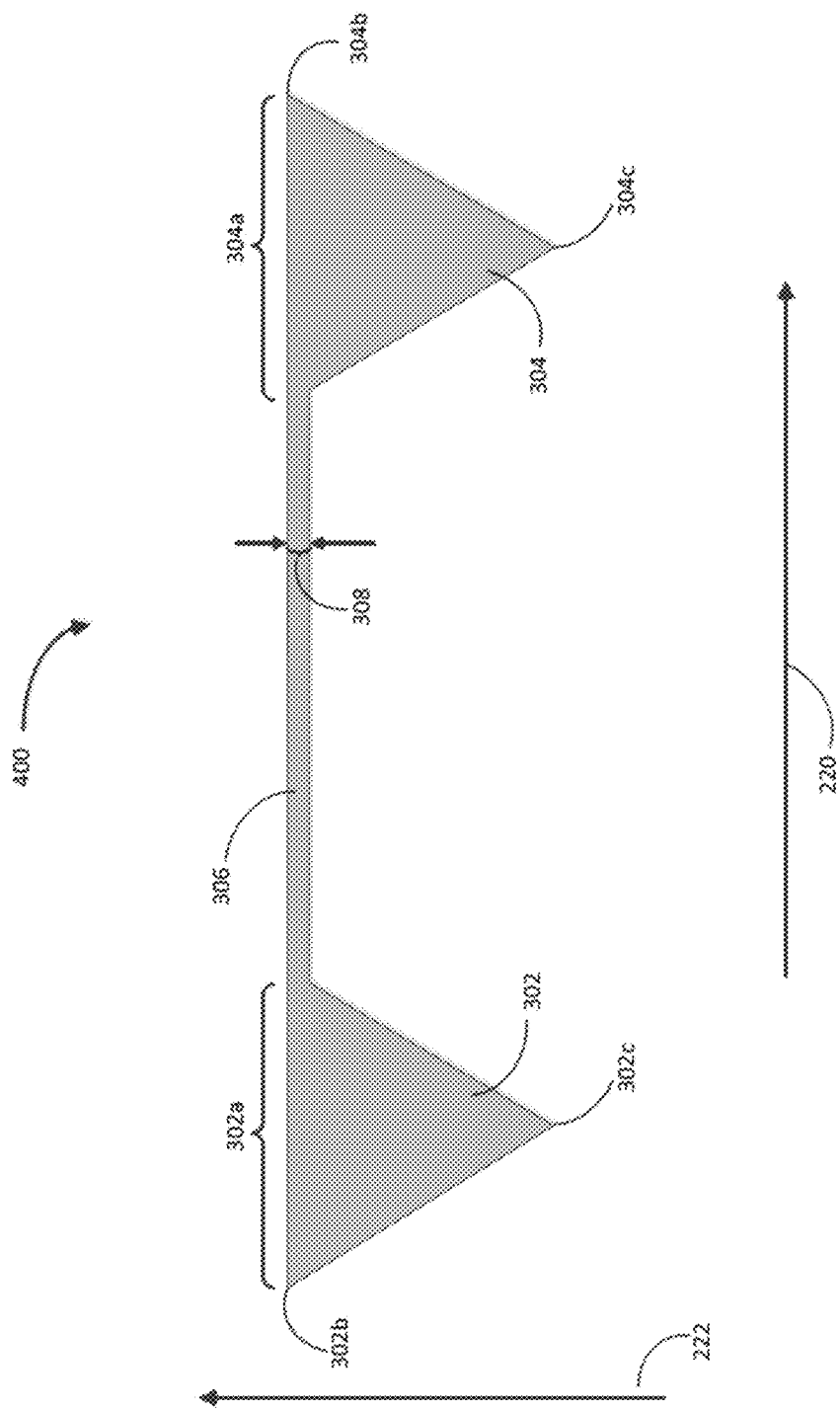

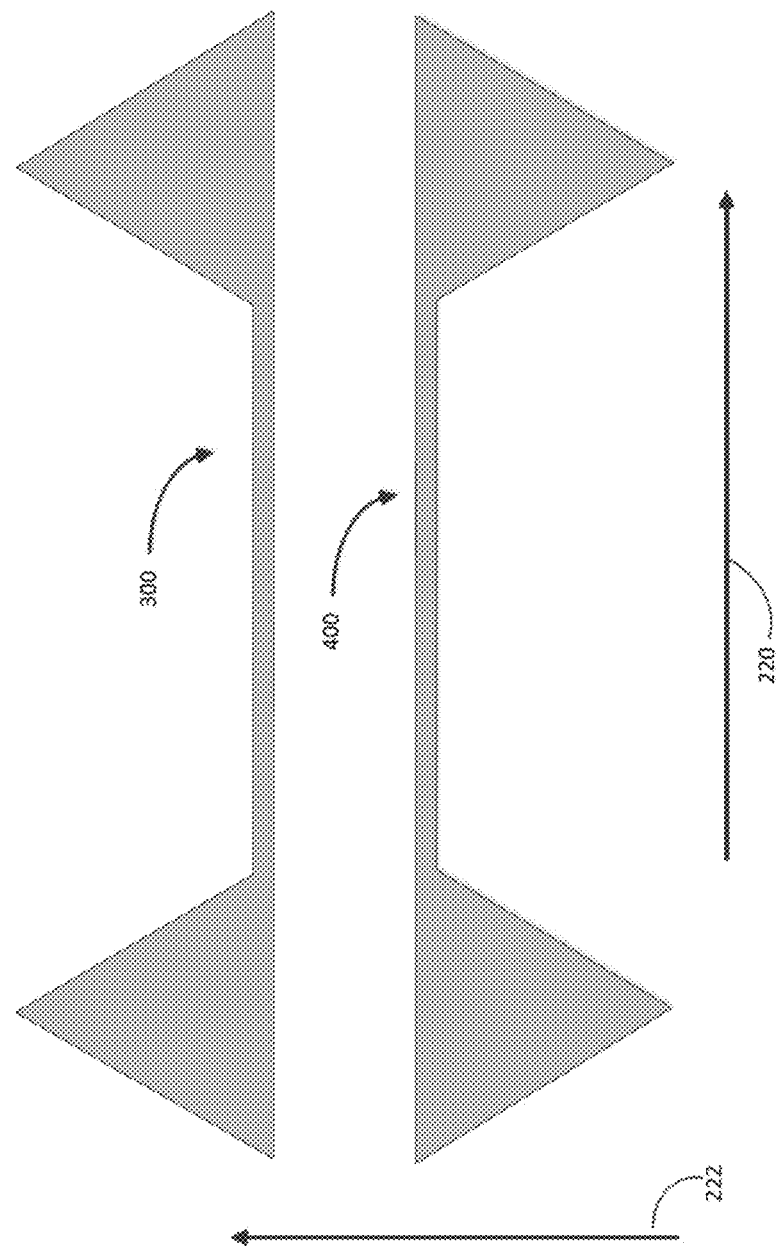

COMMUNICATING ALARM TRIGGER STATUS

BACKGROUND

It can be difficult to manually monitor complex machines that have several moving and/or vibrating parts (e.g., turbines, compressors, etc.). Monitoring systems are commonly used to monitor the operation of complex machines, and generate alarms when the machine is not operating as desired. Monitoring systems can include sensors to detect operational information (e.g., operating parameters, operational states, etc.) associated with the machines, and relay a signal to a computing device which can visually present the operational information for a designated personnel.

Operational information of a complex machine can include information related to multiple operational parameters and multiple operational states of the machine. Additionally, the computing device receiving the operational information can automatically generate alarms to identify undesirable behavior of the machine. These alarms can be generated based off of alarm triggers or set points, which can be uniquely configured for the different operational states of a machine. When reviewing the operating behavior of a machine and investigating alarms that have been triggered, it is valuable to view trend data over time, with graphical feedback of these configured alarm triggers.

SUMMARY

In general, systems and methods for communicating alarm trigger status are provided.

In one embodiment, a method can include receiving data characterizing an operational state of a machine and an associated timing information. The method can further include accessing, based on the operational state, an alarm trigger of a plurality of alarm triggers. The alarm trigger can include predefined properties including an alarm threshold value. The method can also include displaying a graphical object representing the alarm trigger. The graphical object displayed in a graphical display space can have a first axis and a second axis for displaying a plot over time of an operational parameter associated with the machine. The graphical object can have a first visual characteristic that can indicate the alarm threshold.

The graphical object can have a variety of configurations. In one embodiment the graphical object can include a first triangle, and a second triangle connected by a line to the first triangle. An edge of the first triangle, an edge of the second triangle and the line can be oriented parallel to the first axis.

In one embodiment of the alarm trigger, the associated timing information can include a duration of the operational state. The duration can be represented by a length of the graphical object. The associated timing information can includes a time of start of the operational state represented by a position of a leading vertex of the graphical object. The first visual characteristic can include a color of at least a portion of the graphical object; or a position of the graphical object along the second axis.

The predetermined properties of an alarm trigger can have a variety of configurations. In one embodiment of the alarm trigger, the predetermined properties can include an alarm type that can include an over alarm type, an under alarm type, and an out of band alarm type. The graphical object oriented upwards can represent an alarm trigger having an over alarm type. The graphical object oriented downwards can represent an alarm trigger having an under alarm type. The graphical object oriented downward combined with the graphical object oriented upwards can represent an alarm trigger having an out of band alarm type. The predefined properties can include an alarm status including a current alarm status and a historic alarm status. The graphical object can include the first and second triangle characterized by a single color can represent the current alarm status. The graphical object including the first and second triangle characterized by a plurality of colors can represent the historic alarm status.

In another embodiment, the predefined properties of the alarm trigger can include an alarm source including a device protection source and a condition monitoring source. The graphical object including the line characterized by a thickness greater than a first predetermined thickness can represent the device protection source. The graphical object can include the line characterized by a thickness less than a second predetermined thickness can represent the condition monitoring source.

In yet another embodiment, predefined properties of the alarm trigger can include an alarm activity that can include an active alarm activity and a suppressed alarm activity. The graphical object can include a solid line representing the active alarm activity. The graphical object can include a dashed line representing the suppressed alarm activity.

In one embodiment, the method can include receiving data representative of the operational parameter from the sensor. In another embodiment the operational state can include one of start-up state, steady operation state, shut-down state, slow roll state or machine roll state. In yet another embodiment, the machine can include one of a motor, a gas turbine, a heat exchanger, centrifugal pumps, centrifugal compressors, fans, reciprocating compressors, generators, steam turbines, wind turbines, piping, axial compressors, screw compressors, gears, turbo-expanders, blowers, agitators, mixers, pulp refiners, ball mills, crushers, pulverizers, extruders, pelletizers, cooling towers, and the like.

In one embodiment, the method can further include accessing, based on the operational state, multiple alarm triggers of the plurality of alarm triggers. Each of the multiple alarm triggers can include predefined properties that can include an alarm threshold value. The method can also include displaying a graphical object for each of the multiple alarm triggers. The graphical object for each of the multiple alarm triggers can be displayed in the graphical display space.

In one embodiment, the method can further include receiving data characterizing a second operational state of a machine and an associated timing information. The method can also include accessing, based on the second operational state, a second alarm trigger of the plurality of alarm triggers. The second alarm trigger can include predefined properties that can include a second alarm threshold. The method can also include displaying a second graphical object that can represent the second alarm trigger. The second graphical object can be displayed in the graphical display space, and can have a visual characteristic that can indicate the second alarm threshold.

In one embodiment, a non-transitory medium can be configured to receive data characterizing an operational state of a machine and an associated timing information. The non-transitory medium can access, based on the operational state, an alarm trigger of a plurality of alarm triggers, the alarm trigger can include predefined properties that can include an alarm threshold. The non-transitory medium can display a graphical object representing the alarm trigger. The graphical object displayed in a graphical display space can have a first axis and a second axis for displaying a plot over time of operational parameter associated with the machine. The graphical object can have a first visual characteristic that can indicate the alarm threshold.

In one embodiment, a method can include receiving data characterizing an operational state of a machine and an associated timing information. The method can also include accessing, based on the operational state, an alarm trigger of a plurality of alarm triggers. The alarm trigger can include predefined properties including an alarm level. The alarm level can represent a severity associated with the alarm trigger. The method can also include displaying a graphical object representing the alarm trigger. The graphical object can be displayed in a graphical display space having a first axis and a second axis for displaying a plot over time of an operational parameter associated with the machine. The graphical object can have a color representative of the alarm trigger.

Various aspects of the disclosed subject matter may provide one or more of the following capabilities. The alarm trigger communication system can improve the workflow of users monitoring the operation of a machine through an improved graphical display space that displays graphical objects representative of alarm triggers along with operational parameters of the machine. The alarm trigger communication system can select appropriate alarm triggers based on operational states of the machine, and display a graphical object that visually incorporates properties of the alarm trigger. For example, by varying shape, size, orientation, color and design of graphical objects, alarm trigger properties can be conveyed. A user can efficiently detect anomalous behavior in the machine's operational parameter by viewing the operational parameter in relation to the graphical object. The alarm trigger system can also provide the user with the flexibility to change the properties of the alarm trigger (e.g., in response to change in the operation of the machine over time).

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which:

FIG. 4A illustrates an exemplary embodiment of a graphical object having a downward orientation indicative of an under alarm type of the alarm trigger;

FIG. 4B illustrates an exemplary embodiment of a graphical object having a mixed orientation indicative of an out of band alarm type of the alarm trigger;

DETAILED DESCRIPTION

Figure 1:
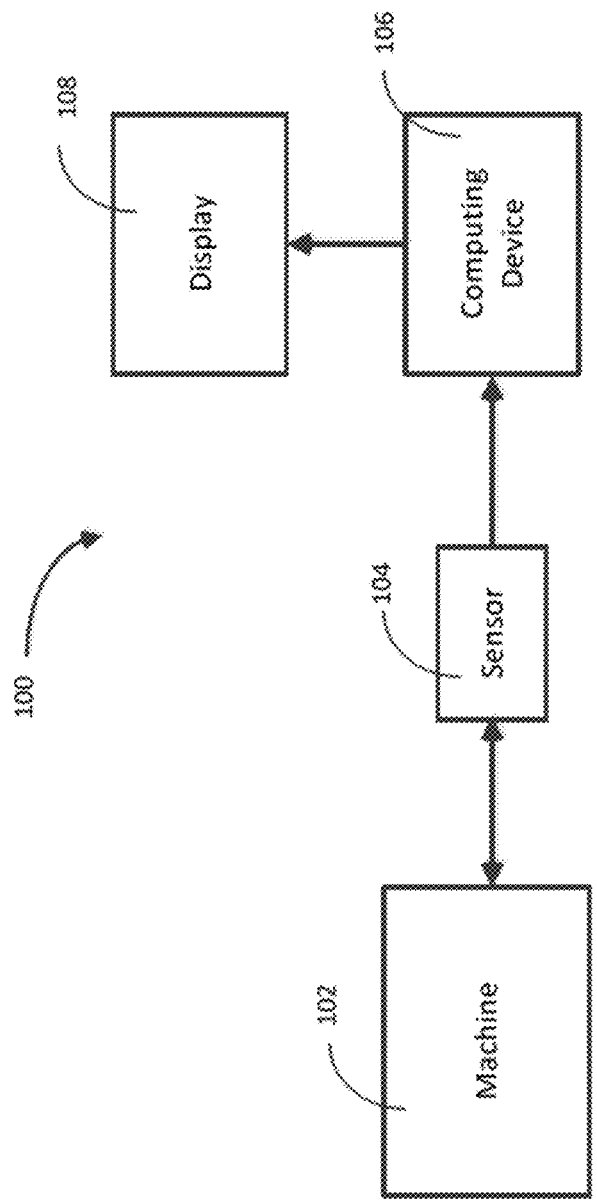
FIG. 1 is a schematic representation of an exemplary embodiment of an alarm trigger communication system.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon Monitoring the operation of a machine can improve machine longevity and the safety of the facility housing the machine. Therefore, it is desirable to detect undesired behavior in the operation of machines (for example, by a network of sensors), and respond appropriately to the detected undesired behavior. Monitoring can be performed by measuring and displaying (e.g., on a graphical display space) the operating parameters of the machine to a user of the machinery. However, simply displaying the operating parameters can fail to provide the user with information related to a possible undesired behavior. As an example, by simply looking at a plot of the operational parameter, the user may not know that the value of the operational parameter has exceeded an undesired value. Embodiments of alarm trigger communication system described in the present disclosure can provide visual indicators that can represent boundaries between desired and undesired behavior of the machine.

A complex machine can operate in multiple operational states and has multiple operational parameters. Monitoring complex machines can be a challenging task. Embodiments of alarm trigger communication system described in this application can present the detected operational parameters with visual indicators that can guide the user to quickly detect an undesired operation. The visual indicator can be in the form of graphical objects superposed or superimposed on the graph of operational information. The alarm trigger communication system can select an appropriate alarm trigger and display an appropriate graphical objects that can provide detailed information related to properties of an alarm trigger (e.g., urgency associated with the alarm trigger, nature of the alarm trigger, user defined changes in alarm trigger threshold, etc.) through easy to understand visual representations. Various properties of the alarm trigger can be encoded in the shape, size, orientation, color and design of graphical objects. By simultaneously viewing the operational parameter with the graphical objects, a user can quickly understand the nature of the undesired behavior in the operational parameter, and can respond adequately.

FIG. 1 is a schematic representation of an exemplary embodiment of an alarm trigger communication system 100 that can monitor the operation a machine 102. The system 100 can include a sensor 104, a computing device 106, and a display 108. The sensor 104 can detect operational information (e.g., operating parameters, operational states, etc.) of the machine 102 and can relay the detected information to the computing device 106. The computing device 106 can receive the operational information and can visually presents the information on a graphical display space of display 108. The computing device 106 can also generate/select alarm triggers, for example, based on operational states of the machine 102, and graphically present the alarm triggers on the graphical display space. An alarm trigger can indicate various attributes associated with the operation of a machine. For example, alarm triggers can provide benchmarks (e.g., maximum/minimum threshold values) that can be used to detect anomalous behavior in the operational parameters of the machine 102. A user of the system 100 can configure the computing device 106 to add alarm triggers, modify the properties of existing alarm triggers, or delete existing alarm triggers.

Figure 2:
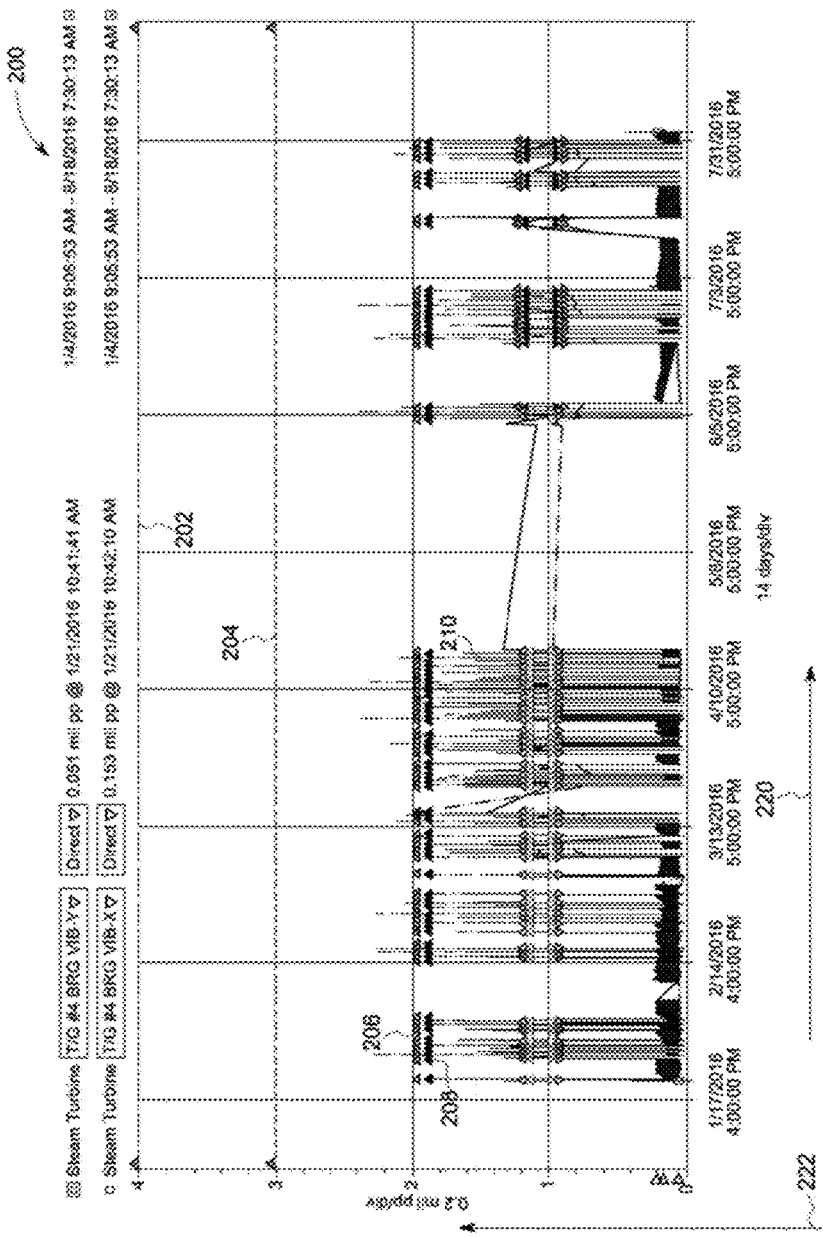
FIG. 2 illustrates an exemplary embodiment of a graphical display space that includes graphical objects representative of an alarm trigger in the alarm trigger communication system in FIG. 1.

FIG. 2 illustrates an exemplary embodiment of a graphical display space 200 of the alarm trigger communication system 100 that can display a plot of operational parameter 210 over time (e.g., operational parameter from the sensor 104 that is representative of operational parameters of the machine 102). The graphical display space 200 can include a first axis 220 representative of a time related to the detection time of the operational parameter 210. The first axis 220 can also indicate timing information associated with the operational state of the machine 120, for example, the time at which the machine enters an operational state, the duration of the operational state, and the time at which the machine 120 exits the operational state. The first axis 220 in FIG. 2 can represent the operation of a machine over the course of several months (e.g., January to August of 2016).

The graphical display space 200 can also include a second axis 222 representative of, for example, the value of the operational parameter 210. In addition to the operational parameter 210, the display space 200 can include graphical objects 202, 204, 206 and 208 that represent various alarm triggers generated by a computing device (e.g., computing device 106) or selected by the computing device from a database of alarm triggers. As discussed in detail below, the alarm triggers can include several alarm properties such as alarm status, alarm source, alarm activity, alarm level and alarm type. The alarm properties can be visually represented by the graphical objects, for example, by color, orientation, shape, size and location of the graphical objects.

An alarm trigger can include an alarm threshold value that can be related to the machine operational state that the alarm trigger represents, and the alarm level of the alarm trigger. Examples of machine operational state can include, for example, start-up state (e.g., when the machine is starting up), steady operation state, slow roll state (when the machine is warming up before start-up, or cooling down before being turned off), shutdown state (when the machine is in the process of shutting down), and machine off state (when the machine is off). Alarm levels can be representative of the severity of the alarm trigger and can be visually represented by the color of the graphic object representing the alarm trigger. The alarm threshold value can determine the location of the graphical object along the second axis 222. For example, graphical objects 202, 204, 206 and 208 can represent alarm triggers with different alarm threshold values, and can be therefore separated along the axis 222. An intersection between the plot 210 of the operational parameter and a graphical object representing an alarm trigger visually indicates that an alarm event has occurred. For example, an intersection between the plot 210 and the graphical object 208 can indicate the occurrence of a severe alarm event (if the graphical object 208 represents an alarm trigger having a severe alarm threshold value) that may require the machine to be shut down.

The predetermined properties of an alarm trigger can include an alarm type that can be related to the occurrence of an alarm event. For example, if an alarm event occurs when one or more values of the operational parameter exceeds the alarm trigger threshold, the alarm trigger can be characterized by an "over" alarm type. If an alarm event occurs when one or more values of the operational parameter is less than the alarm trigger threshold, the alarm trigger can be characterized by an "under" alarm type. If an alarm event occurs when one or more values of the operational parameter falls beyond a range of alarm trigger threshold values, the alarm trigger can be characterized by an "out of band" alarm type. As described below, a graphical object can be configured, for example, based on their orientation, to indicate the alarm type of the alarm trigger.

The predetermined properties of an alarm trigger can also include an alarm status that can be related to the validity of the alarm threshold value. A user can change the alarm threshold value of an alarm trigger based on, for example, a change in the operation of the machine over the course of its lifetime. This can result in the generation of a new alarm trigger with a valid alarm threshold value, and can be referred to having a "current" alarm status. The old alarm trigger, with an alarm threshold value that has been altered, can be referred to as having a "historical" alarm status. As described below, a graphical object can be configured to, for example, based on the coloring pattern of portions of the graphical object, to indicate the alarm status of the alarm trigger.

The predetermined properties of an alarm trigger can further include an alarm source that can be related to the capabilities of the alarm trigger. If the alarm trigger can be configured to monitor the operation of a machine (e.g., machine 120 which is monitored by the system 100), it can be referred to as having "condition monitoring" alarm source. On the other hand, if the alarm trigger can be configured to shut-down the machine, it can be referred to as having "protection" alarm source. A graphical object can be configured to, for example, indicate the alarm source of the alarm trigger based on shape of the graphical object.

The predetermined properties of an alarm trigger can include an alarm activity that can be related to the validity of the alarm trigger. For example, if an alarm trigger is configured to generate an alarm event (e.g., based on the relative values of operational parameter and alarm threshold value), the alarm trigger can be said to have an "active" alarm activity. On the other hand, a user can disable an alarm trigger by setting the alarm activity to "suppressed" mode. This can be desirable to set a suppressed alarm activity when, for example, the operational parameters of the machine are not detected properly. A graphical object can be configured to, for example, to indicate the alarm activity of the alarm trigger based on the patterns on portions of the graphical object.

Alarm triggers can be independent of the machine operational state and therefore independent of the duration of the operational state. For example, graphical object 202 and 204 which represent alarm triggers that are independent of the operational state can extend across the time duration of various operational sates along the first axis 220. Alarm triggers that depend on the machine operational states can be represented by graphical objects (e.g., graphical objects 206 and 208) that extend across a portion of the axis 220 that represents the time and duration of the operational state.

Figure 3:
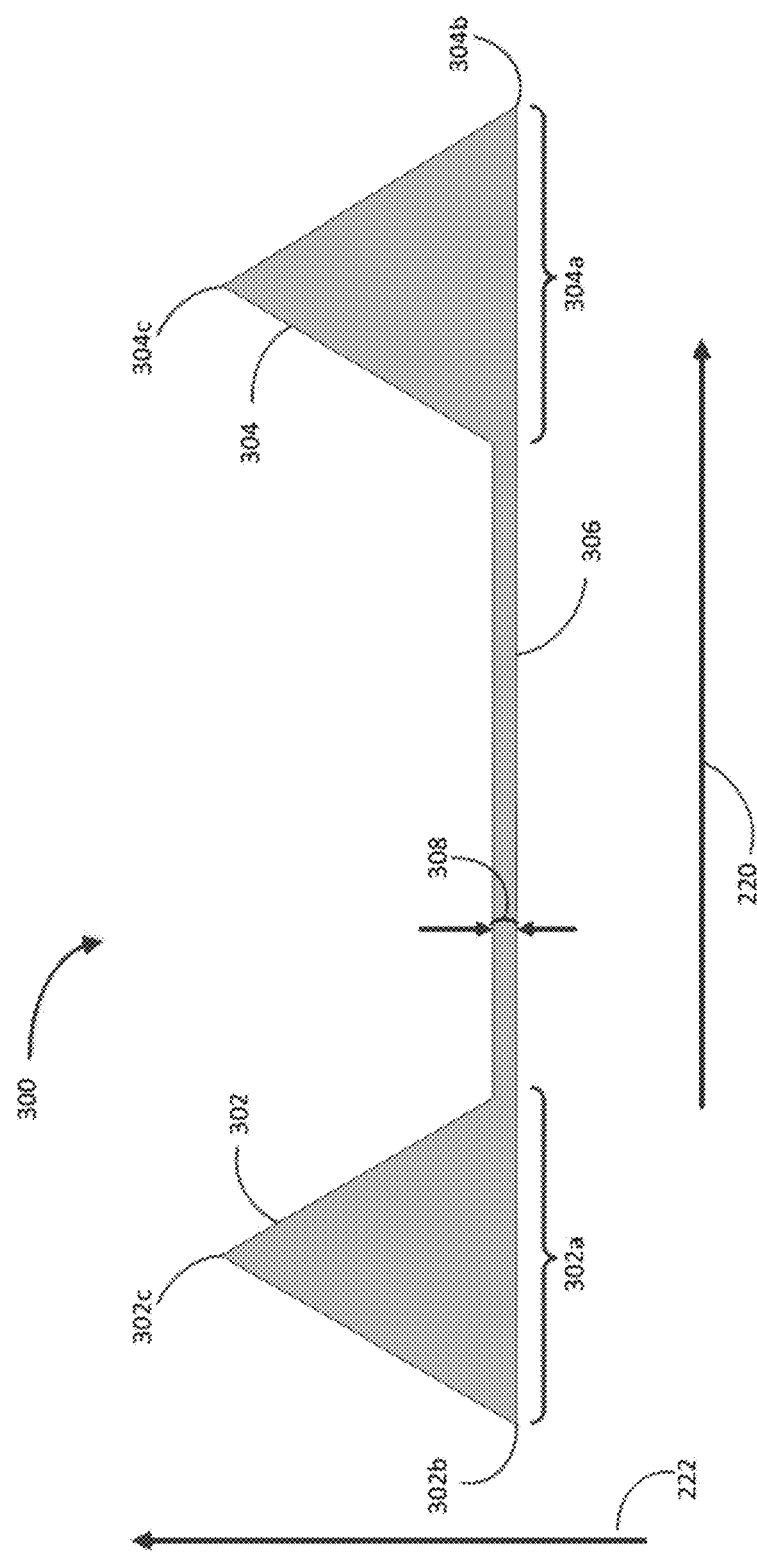
FIG. 3 illustrates an exemplary embodiment of a graphical object including a pair of triangles and a line in the graphical display space, and indicative of a alarm trigger.

FIG. 3 illustrates an exemplary embodiment of a graphical object 300 indicative of an alarm trigger. The graphical object 300 can include triangles 302 and 304 that are connected by the line 306. The line 306 can extend substantially parallel to the edges 302a and 304a of the triangles 302 and 304, respectively. The line 306, and edges 302a and 304a can be oriented substantially parallel to the first axis 220. The position of the leading vertex 302b with respect to the axis 220 can represent the time of start of an operational state, and the position of the trailing vertex 304b with respect to the axis 220 can represent the end time of the operational state. The extent of the graphical object 300 along the axis 220 (e.g., distance between the leading vertex 302a and 302b) can be representative of the duration of an operational state. The line 306 has a thickness 308 which can indicative of the alarm source of the alarm trigger represented by the graphical object 300. For example, if the thickness is greater than a predetermined value, the graphical object 300 can represent a first alarm source, and if the thickness is less than the predetermined value, the graphical object 300 can represent a second alarm source.

The triangles 302 and 304 include peak vertices, 302c and 304c. The ratio between the distance between of the vertices 302c and/or 304c and the first axis 220 and the distance between the line 306 and the first axis 220 can determine an orientation of the graphical object 300. For example, in FIG. 3, the peak vertices 302c and 304c are farther from the first axis 220 than the line 306 and are considered to be oriented "upwards." The upward orientation can be indicative of the alarm type of the alarm trigger. For example, the upward orientation can indicate an over alarm type.

The coloring, shading, and/or pattern of the triangle 302 (and/or triangle 304) can be indicative of the alarm status of the alarm trigger represented by the graphical object 300. For example, if the triangle 302 (and/or triangle 304) includes a single color (e.g., solid color), the alarm trigger represented by graphical object 300 can have a current alarm status. Variations in the color of the graphical object can be indicative of the alarm level of the of the alarm trigger represented by the graphical object 300. For example, if the graphical object 300 is colored red, the alarm trigger represented by the graphical object 300 can have a fourth alarm level (e.g., representative of an urgent emergency in the machine 120). Other colors can include, for example, red, orange, yellow, grey, etc.). Variations in the line 306 of the graphical object 300 can be indicative of the alarm activity of the alarm trigger represented by the graphical object 300. For example, if the line 306 is a solid line, the alarm trigger represented by graphical object 300 can have an active alarm activity.

FIGS. 4-8 illustrate variations in orientation, coloring pattern, shape, size, and color of the graphical object 300. Visual characteristics can represent variation in alarm type, alarm status, alarm source, alarm activity, and alarm level of the alarm trigger. FIG. 4A illustrates an exemplary embodiment 400 of the graphical object having a "downward" orientation that can indicate an under alarm type. For example, the peak vertices 302c and 304c are nearer to the first axis 220 than the line 306. The downward orientation can be indicative of an over alarm type. FIG. 4B illustrates an exemplary embodiment of the graphical object having a "mixed" orientation that can indicate an out of band alarm type. The graphical object with "mixed" orientation can include the graphical object having the "upward" orientation (e.g., graphical object 300) and the graphical object having the "downward" orientation (e.g., graphical object 400).

Figure 5:
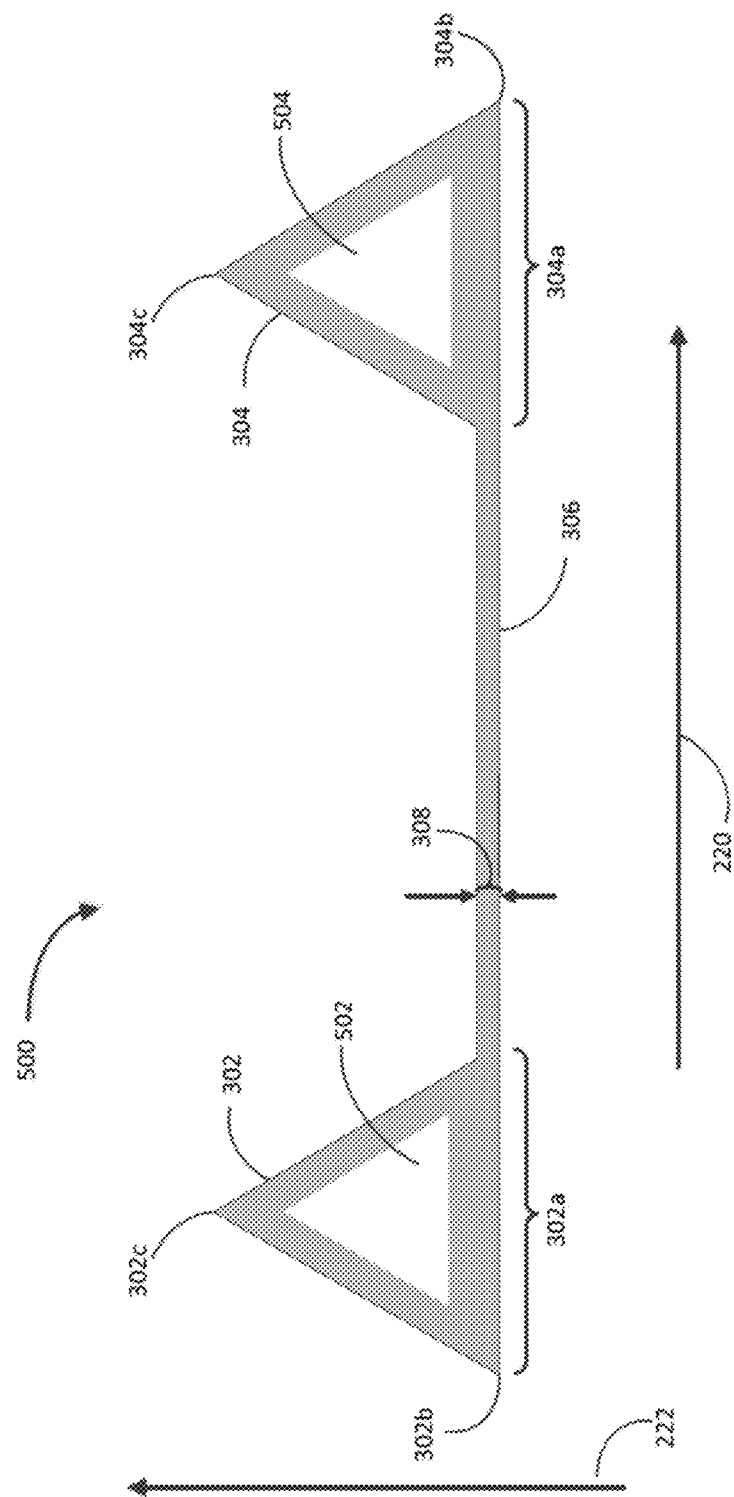
FIG. 5 illustrates exemplary embodiments of a graphical object indicative of a historical alarm status of the alarm trigger.

FIG. 5 illustrates an exemplary embodiment of a graphical object 500 that can indicate an alarm trigger having a historical alarm status. As shown in FIG. 5, the triangles (e.g., 302 and 304) in the embodiment 500 can include a pattern. For example, triangle 302 can includes a second triangle 502 that can have a different color from that of triangle 302. Likewise, triangle 304 can includes a triangle 504 that can have a different color from that of triangle 304. As an example, triangle 304 of a non-white color (e.g., red, orange, yellow, grey, etc.) can include white triangle 504, and as a result appear unfilled.

Figure 6:
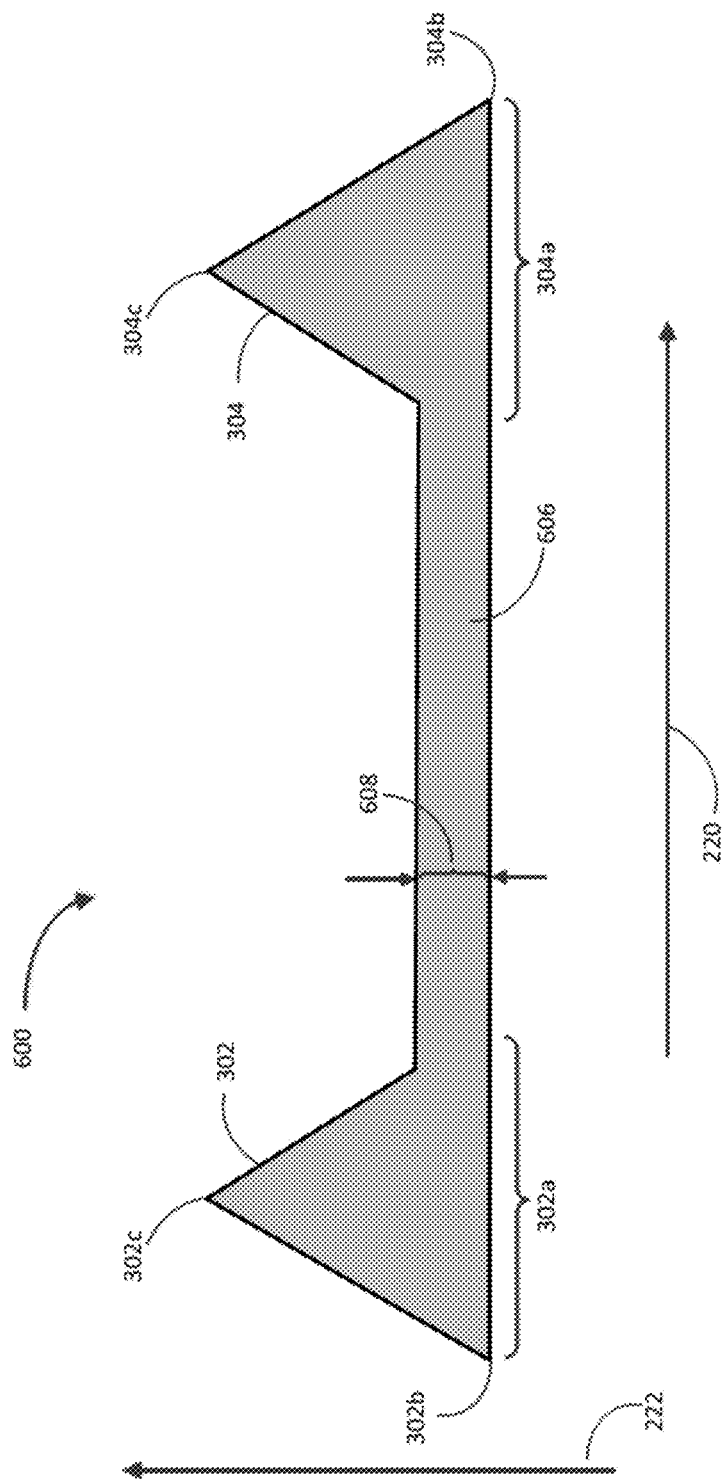
FIG. 6 illustrates exemplary embodiments of the graphical object indicative of a condition monitoring alarm source of the alarm trigger.

FIG. 6 illustrates an exemplary embodiment of a graphical object 600 with a line 606 that can have a greater thickness 608 compared to the thickness 308 of the line 306 of graphical object 300. Variation in the thickness of the lines can be indicative of variation in the alarm sources of the alarm triggers represented by graphical objects 300 and graphical object 600. For example, graphical object 300 can represent an alarm trigger having a condition monitoring alarm source while the graphical object 600 can represent an alarm trigger having a protection alarm source.

Figure 7:
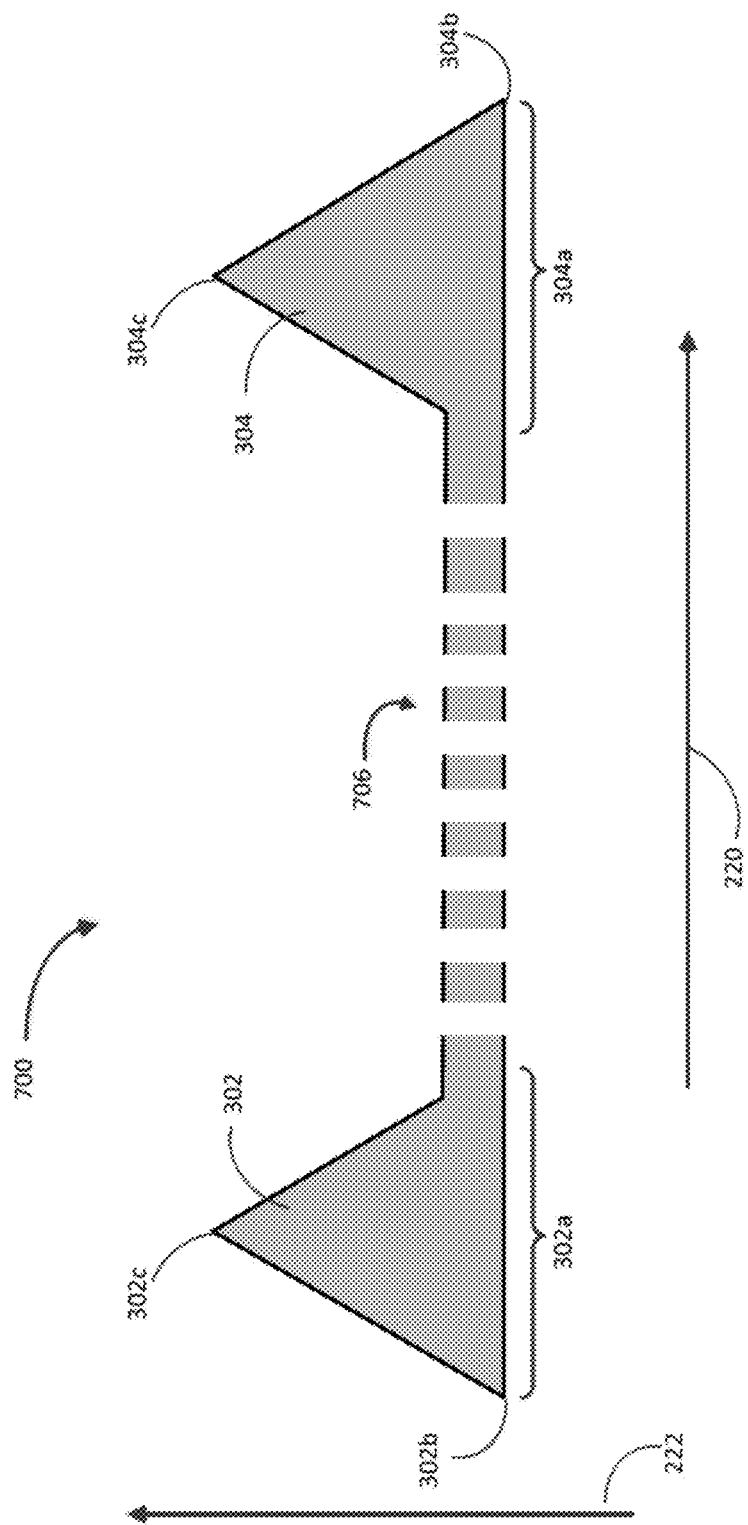
FIG. 7 illustrates exemplary embodiments of a graphical object indicative of a suppressed alarm activity of the alarm trigger.

FIG. 7 illustrates an exemplary embodiment of a graphical object 700 that can includes discontinuities in the line 706 that connects triangle 302 with the triangle 304. As a result of the discontinuities, the line 706 can appear "dashed." Variation in the continuity of the line of a graphical object can be indicative of variation in the alarm activity of the alarm triggers represented by graphical objects. For example, the graphical object 700 can represent an alarm trigger having a suppressed alarm activity. On the other hand, alarm trigger 300 can have a continuous and/or solid line 306 that can represent an alarm trigger having an active alarm activity.

Figure 8:
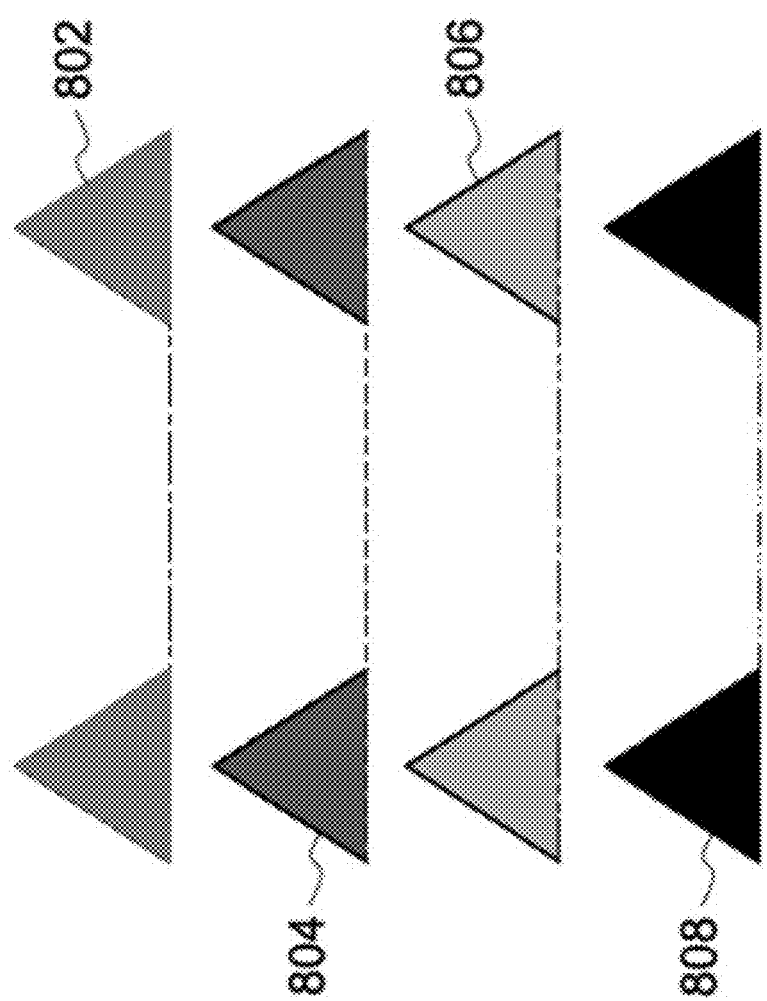
FIG. 8 illustrates exemplary embodiments of graphical objects having various alarm levels.

FIG. 8 illustrates an exemplary embodiment of graphical objects 802, 804, 806 and 808 that can represent alarm triggers alarm triggers with varying alarm levels. The objects 802-808 can include different colors indicative of the different alarm levels. For example, graphical object 802 can be red which can represent a fourth alarm level (e.g., fourth alarm level can indicate a severe alarm event that can result in the shut-down of the machine). Similarly, graphical objects 804, 806 and 808 can be orange (third alarm level), yellow (second alarm level) and grey (first alarm level), respectively.

Figure 9:
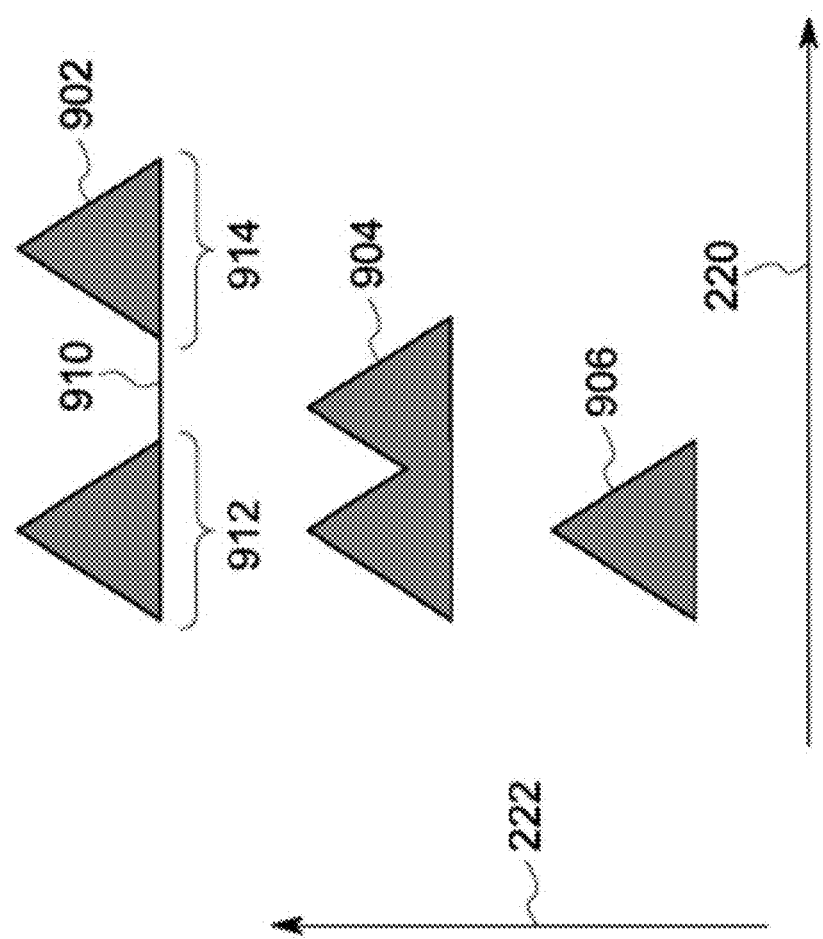
FIG. 9 illustrates an exemplary embodiment of graphical objects representing alarm triggers for operational states having varying time duration.

FIG. 9 represents exemplary embodiments of graphical objects 902, 904 and 906 that can represent alert triggers for operational states having varying time durations. As described before, the horizontal extent (extent of the graphical object along the first axis 220) can be representative of the duration of the operational state. As the duration of the operational state decreases, the length of the line 910 can decreases to account for the decrease in the time duration of the operational state. If the time duration of the operational state is shorter than the time duration represented by the combined lengths of the edges 912 of the first triangle and 914 of the second triangle, the two triangles can overlap (as shown in the graphical object 904). If the time duration of the operational state is shorter than the time duration represented by a single edge of the triangles in the graphical object (e.g., edge 912, edge 914, etc.) a single triangle (as shown in graphical object 906) can represent the trigger alarm associated with the operational state.

Figure 10:
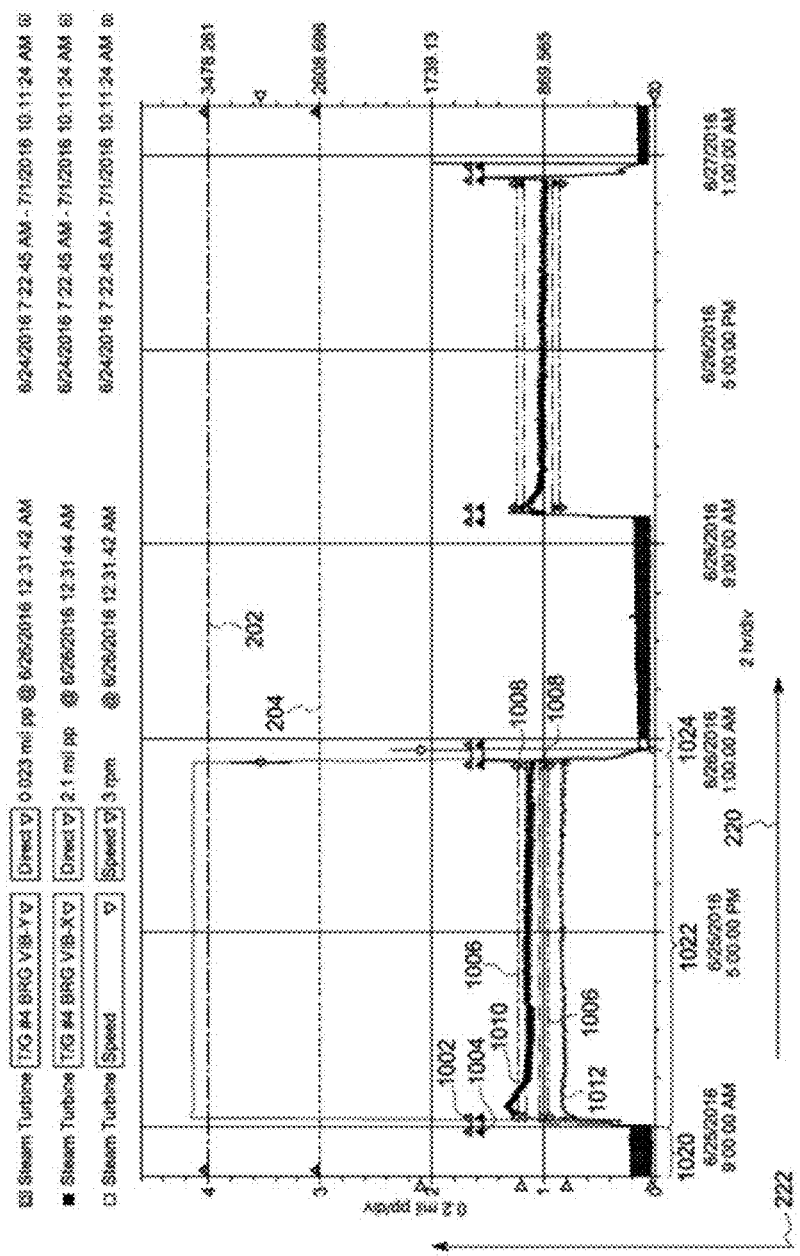
FIG. 10 illustrates a zoomed in view of the exemplary embodiment of the graphical in FIG. 2.

FIG. 10 illustrates a zoomed in view of the exemplary embodiment of the graphical in FIG. 1 that can represent the operational states of a machine (e.g., machine 120) over a period of two days. The graphical display space can includes graphical objects 202 and 204 (also shown in FIG. 1) that are independent of the operational state of the machine. The graphical display space can also includes graphical objects 1002 and 1004 that represent alarm triggers having over alarm type for an operational state having a time duration 1020. The alarm trigger communication system (e.g., system 100) can select several alarm triggers (e.g., sequentially) for a given operational state and can display the corresponding graphical objects after each selection. Graphical objects 1006 and 1008 can represent alarm triggers having an out of band alarm type for an operational state having a time duration 1022. Plot 1010 over the axis 220 can represent an operational parameter of the machine.

Figure 11:
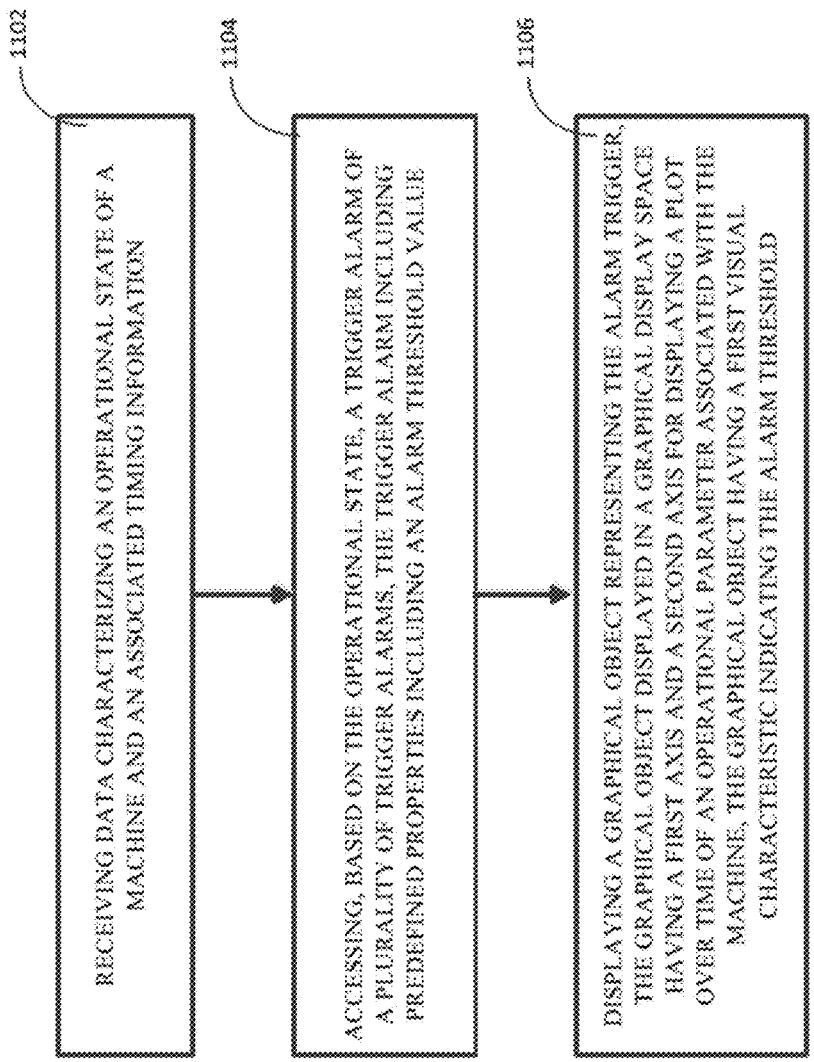
FIG. 11 illustrates an exemplary method for operating an alarm trigger communication system.

FIG. 11 describes an exemplary method of operation of an alarm trigger communication system (e.g., communication system 100). At 1102, the computing device (e.g., computing device 106) can receive data characterizing an operational state of a machine (e.g., machine 102) and an associated timing information. The data characterizing the operational state of the machine can be detected by a sensor (e.g., sensor 104). The computing device can receive the data directly from the sensor. In some implementations, the data can be transferred to one or more intermediary devices (e.g., memory device, routers, etc.) from which the computing device can receive the data.

At 1104, the computing device can access based on the operational state, an alarm trigger of a plurality of alarm triggers, the alarm trigger comprising predefined properties comprising an alarm threshold value. The computing device can access the alarm trigger from a database of alarm triggers (e.g., relational database) in a memory device. For example, in a relational alarm trigger database, information related to alarm triggers (e.g., associated operational state, alarm threshold values, alarm status, alarm type, alarm source, alarm activity, etc.) can be stored in a relational table. The computing device can search the relational alarm trigger database and select one or more alarm triggers associated with the operational state received at 1102.

In the step 1106, the computing device can display a graphical object representing the alarm trigger. The graphical object can be displayed in a graphical display space that can include a plot over time of the operational parameter of the machine. The operational parameter of the machine can be received by the computational device, for example, from the sensor (e.g., sensor 104) configured to detect the operational parameters of the machine (e.g., machine 102). The graphical display space can have a first axis and a second axis. The first axis can represent timing information (e.g., time of detection of one or more values of the operational parameter, time of start and duration of the operational state, etc.). The second axis can represent the value of the operational parameter and/or alarm threshold values of alarm triggers. The graphical object having a first visual characteristic (e.g., color, position along the second axis, etc.) indicating the alarm threshold.

Other embodiments are within the scope and spirit of the disclosed subject matter. The alarm trigger operation system can be configured to monitor various industrial machines, for example, turbines, aircraft engines, automobiles, etc. These industrial machines can have several operational parameters such as angular velocity of a rotating part (e.g., gear, coil, etc.), temperature, pressure, vibration, etc. These operational parameters can have a range of desirable values that can be related to the operational state of the machine (e.g., start-up state, shut-down state, steady operation state, etc.) and/or the age of the machine. The alarm trigger operation system can generate visual representations of alarm trigger that can indicate to a user that the operational parameter has an undesirable value.

For example, an operating parameter for a turbine can be the angular velocity of a coil in the turbine. The desirable range of angular velocity of the coil can be different based on whether the turbine is in the start-up state, shut-down state or steady operation state. The alarm trigger monitoring system can detect the angular velocity of the coil using sensors (e.g., accelerometers) attached to the coil, and display the values of angular velocity as a function of time of detection. The time of detection can be represented along a time axis, and the values of the angular velocity can be represented along an angular velocity axis (which can be perpendicular to the time axis). The alarm trigger monitoring system can display one or more graphical objects representing alarm triggers for the various operational states of the turbine (e.g., shut-down state, start-up state, steady state operation state, etc.). For a given operational state, the location and extent of the graphical object along the time axis can indicated the time of start of the operational state and the duration of the operational state, respectively. The location of a graphical object along the angular velocity axis can represent a threshold angular velocity for the coil associated with the operational state. For example, during the steady state operational state, it can be desirable that the angular velocity of the coil lies within a given range of angular velocity values. This range of values can be represented using a graphical object (e.g., graphical object with mixed orientation in FIG. 4B).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving data characterizing an operational state of a machine and an associated timing information;
   accessing, based on the operational state, an alarm trigger of a plurality of alarm triggers, the alarm trigger including predefined properties including an alarm threshold value; and
   displaying a graphical object representing the alarm trigger, the graphical object displayed in a graphical display space having a first axis and a second axis for displaying a plot over time of an operational parameter associated with the machine, the graphical object having a first visual characteristic indicating the alarm threshold,
   wherein the graphical object comprises:
   a first triangle; and
   a second triangle connected by a line to the first triangle, an edge of the first triangle, an edge of the second triangle and the line oriented parallel to the first axis.

2. The method in claim 1, wherein the associated timing information includes a duration of the operational state, the duration represented by a length of the graphical object.

3. The method in claim 1, wherein the associated timing information includes a time of start of the operational state represented by a position of a leading vertex of the graphical object.

4. The method in claim 1, wherein the first visual characteristic comprises a color of at least a portion of the graphical object; or a position of the graphical object along the second axis.

5. The method in claim 1, wherein the predetermined properties comprise an alarm type including an over alarm type, an under alarm type, and an out of band alarm type.

6. The method in claim 5, wherein the graphical object oriented upwards represents the alarm trigger having an over alarm type.

7. The method in claim 5, wherein the graphical object oriented downwards represents the alarm trigger having an under alarm type.

8. The method in claim 5, wherein the graphical object oriented downward combined with the graphical object oriented upwards represents an alarm trigger having the out of band alarm type.

9. The method in claim 1, wherein the predefined properties of the alarm trigger comprise an alarm status including a current alarm status and a historic alarm status.

10. The method in claim 9, wherein the graphical object comprising the first and the second triangle characterized by a single color represents the current alarm status.

11. The method in claim 9, wherein the graphical object comprising the first and the second triangle characterized by a plurality of colors represents the historic alarm status.

12. The method in claim 1, wherein the predefined properties of the alarm trigger comprise an alarm source including a device protection source and a condition monitoring source.

13. The method in claim 12, wherein the graphical object comprising the line characterized by a thickness greater than a first predetermined thickness represents the device protection source.

14. The method in claim 12, wherein the graphical object comprising the line characterized by a thickness less than a second predetermined thickness represents the condition monitoring source.

15. The method of claim 1, wherein the predefined properties of the alarm trigger comprises an alarm activity including active alarm activity and suppressed alarm activity.

16. The method in claim 15, wherein the graphical object comprises a solid line representing the active alarm activity.

17. The method in claim 15, wherein the graphical object comprises a dashed line representing the suppressed alarm activity.

18. The method in claim 1, further comprising receiving data representative of the operational parameter from a sensor.

19. The method in claim 1, wherein the operational state comprises one of start-up state, steady operation state, shut-down state, slow roll state or machine roll state.

20. The method in claim 1, wherein the machine comprises one of a motor, a gas turbine, a heat exchanger, centrifugal pumps, centrifugal compressors, fans, reciprocating compressors, generators, steam turbines, wind turbines, piping, axial compressors, screw compressors, gears, turbo-expanders, blowers, agitators, mixers, pulp refiners, ball mills, crushers, pulverizers, extruders, pelletizers, and cooling towers.

21. The method of claim 1, further comprising:
accessing, based on the operational state, multiple alarm triggers of the plurality of alarm triggers, each of the multiple alarm triggers comprising predefined properties comprising an alarm threshold value; and
displaying a graphical object for each of the multiple alarm triggers, the graphical object for each of the multiple alarm triggers displayed in the graphical display space.

22. The method of claim 1 further comprising:
receiving data characterizing an another operational state of the machine and an associated timing information;
accessing, based on the another operational state, an another alarm trigger of the plurality of alarm triggers, the another alarm trigger comprising predefined properties comprising an another alarm threshold; and
displaying an another graphical object representing the second alarm trigger, the another graphical object displayed in the graphical display space, the another graphical object having a visual characteristic indicating the second alarm threshold.

23. A non-transitory computer readable medium storing instructions, which when executed by at least one data processor forming part of at least one computing system causes the at least one data processor to perform operations that comprise:
receive data characterizing an operational state of a machine and an associated timing information;
access, based on the operational state, an alarm trigger of a plurality of alarm triggers, the alarm trigger comprising predefined properties comprising an alarm threshold; and
display a graphical object representing the alarm trigger, the graphical object displayed in a graphical display space having a first axis and a second axis for displaying a plot over time of operational parameter associated with the machine, the graphical object having a first visual characteristic indicating the alarm threshold,
wherein the graphical object comprises:
a first triangle; and
a second triangle connected by a line to the first triangle, an edge of the first triangle, an edge of the second triangle and the line oriented parallel to the first axis.

24. A method comprising:
receiving data characterizing an operational state of a machine and an associated timing information;
accessing, based on the operational state, an alarm trigger of a plurality of alarm triggers, the alarm trigger including predefined properties including an alarm level, the alarm level representative of a severity associated with the alarm trigger; and
displaying a graphical object representing the alarm trigger, the graphical object displayed in a graphical display space having a first axis and a second axis for displaying a plot over time of an operational parameter associated with the machine, the graphical object having a color representative of the alarm trigger,
wherein the graphical object comprises:
a first triangle; and
a second triangle connected by a line to the first triangle, an edge of the first triangle, an edge of the second triangle and the line oriented parallel to the first axis.

* * * * *